United States Patent
Sayles

[11] 3,792,589
[45] Feb. 19, 1974

[54] FLOATING BARRIER

[75] Inventor: James A. Sayles, Kensington, Calif.

[73] Assignee: Chevron Research Company, San Francisco, Calif.

[22] Filed: Jan. 17, 1972

[21] Appl. No.: 218,253

[52] U.S. Cl. ................................................. 61/1 F
[51] Int. Cl. .......................................... E02b 15/04
[58] Field of Search ......... 61/1 F; 210/242, DIG. 21

[56] References Cited
UNITED STATES PATENTS

| | | | |
|---|---|---|---|
| 3,577,879 | 5/1971 | Ducrocq | 61/1 F |
| 3,499,290 | 3/1970 | Smith | 61/1 F |
| 3,592,006 | 7/1971 | Crucet | 61/1 F |
| 3,579,994 | 5/1971 | Preus | 61/1 F |

FOREIGN PATENTS OR APPLICATIONS

| | | | |
|---|---|---|---|
| 1,558,927 | 1/1969 | France | 61/1 F |

*Primary Examiner*—Peter M. Caun
*Attorney, Agent, or Firm*—J. A. Buchanan, Jr.; R. L. Freeland, Jr.; C. J. Gibeau

[57] ABSTRACT

A boom for collecting material floating on the surface of a body of water which can be deployed and recovered expeditiously and without damage to the structure of the boom, and which is made to be stored in a compact condition either as flat layers of folded material or by rolling it on a roller. The boom is constructed to have a continuously smooth outer surface without projections or fixtures or metal parts appearing on its outer surface throughout substantially its entire length, both to eliminate the hazard of such parts being snagged or caught on sharp edges of wharfs or portions of a ship while the boom is being played out or retrieved thereby reducing the possibility of the fabric of the boom being torn and damaged, and also to prevent injury to the men handling the boom by suffering cuts, bruises and wounds from such projecting elements. Particular attention is given to means for distributing stresses imposed on the boom in use to prevent damaging concentration of stress on any part of the fabric from which it is in part made. The boom is made with inflatable flotation chambers from which the air is released when the boom is retrieved and stored and all of the elements of the combination that make up the boom such as the stress cables, stress plates and ballast weights are placed between and within the impervious sides of the boom so that when the air chambers are collapsed the boom has a thickness throughout its total area which is not substantially greater than the thickness of the folded impregnated fabric of which it is made.

10 Claims, 7 Drawing Figures

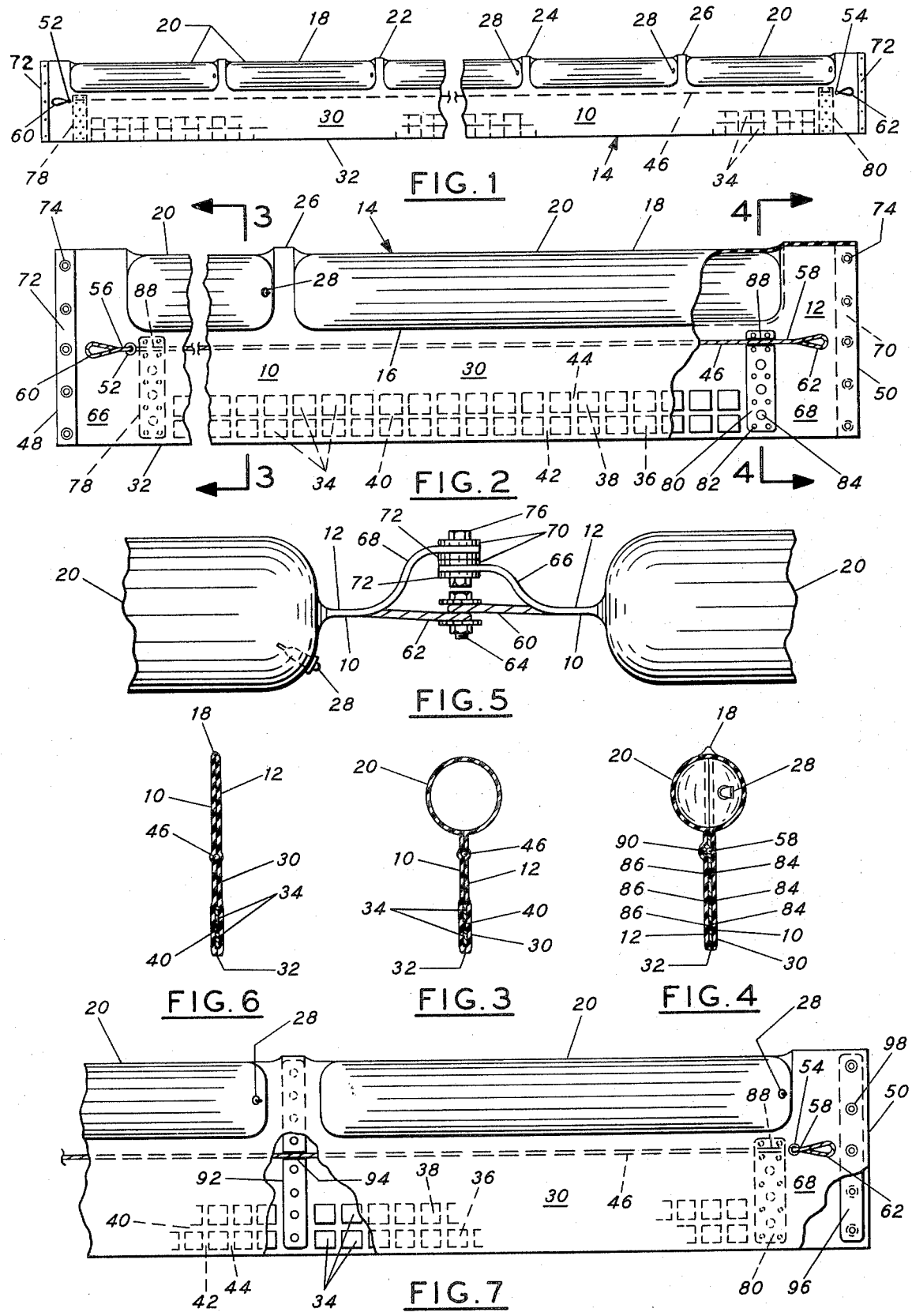

FLOATING BARRIER

BACKGROUND OF THE INVENTION

This invention relates to a boom structure which forms a barrier for collecting from the surface of the water floating contaminating substances which inadvertently have been spilled or otherwise found their way onto it. The boom is constructed with a buoyant upper portion which floats on the surface of the water and with a skirt depending from the buoyant portion and ballasted along its lower edge to hold the skirt submerged in the water. Both the buoyant portion and the skirt comprise the barrier which prevent substances floating on the surface of the water from flowing past the boom which, therefore, assists in collecting and segregating such substances so that they may be concentrated in a location to enable other means to be employed to remove them from the water.

The concept of a boom for this purpose to function generally in the above described manner is known to the art and several modifications of such booms have been constructed and used with more or less success. The boom of the present invention is an improvement over other booms of which we are aware in that by the construction which will be detailed hereinafter, the boom is less susceptible to damage in use or upon being deployed into and retrieved from the water than others of which I have knowledge. This is of importance for two reasons: Firstly, if the boom is damaged in use while it is deployed in the water confining an oil spill, for instance, the damage may be such that the contaminating oil will flow through the damaged section and escape the confine of the boom. This of course is obviously undesirable. The second reason is an economic consideration. Booms in common use today cost from about $5.00 and upwardly a foot, and any spill of appreciable size requires the use of thousands of feet of boom. Thus, it is desirable that the boom be durable enough to be reused many times rather than be substantially entirely destroyed on its first or second use as has been experienced with some of the booms which are now commercially available.

SUMMARY OF THE INVENTION

The boom of the present invention is particularly designed and constructed to be of relatively light weight and to have a compact form when not in use so that it may be stored in a relatively small space. It is designed and constructed with a smooth, tough exterior surface to be handled conveniently by manpower to be set out in operating condition in the water and to be retrieved therefrom without unduly exposing the men to injury by sharp or projecting parts or hazarding damage to the boom structure by snagging such parts. Particular attention is given in the design and construction of the boom to cause the stresses to which it is exposed during use to be imposed on stress members incorporated in the boom for this purpose while preventing undue stress from being concentrated, accidentally or otherwise, on portions of the boom which could be damaged or destroyed by such stresses.

Provision is made for joining boom sections together by a means which will prevent the leakage of contaminants between successive sections to form thereby a barrier of the desired length necessary to collect the contaminants in a spill which may be spread extensively over the surface of the water.

The boom of the present invention employs inflated air chambers as the buoyant medium and provision is made for maintaining the effectiveness of the boom as a barrier even though some of the air chambers may accidentally be deflated.

In pursuance of these objects the boom is constructed of a single sheet of reinforced rubber-like material which is folded along a longitudinal median to form the two sides of it. A tensile stress cable, stress plates, ballast weights, and, in one modification, stiffening members and end plates, are placed between the two sides of the boom in appropriate operating relationship and the sides are then joined together and to at least some of the elements placed between them throughout the area of the sides except for the portions along the top edge of the boom which will form the floatation chambers. However, in the preferred embodiment of this invention the sides are vulcanized together and, as will be described hereinafter, to at least some of the elements enclosed between the sides. Therefore, in the following description vulcanize will be used by way of illustration but not as limitation on the means for joining the parts in coherent relationship.

Preferably a series of relatively short inflatable chambers are formed along the top edge of the boom and each chamber has a valve at one end which enables it to be inflated and deflated. The opposite sides of the boom are vulcanized together between flotation chambers to form the chambers as separate air pockets and this construction gives the boom a degree of stiffness in a lateral direction from the top edge to the bottom edge which will function to hold the top edge of the boom above the surface of the water in a region where an air chamber may inadvertently become deflated by being punctured or otherwise damaged.

For some conditions of use, particularly in rougher water, it will be desirable to incorporate stiffening elements in this lateral region between air chambers to insure that a damaged section will remain above the surface of the water and be effective as a barrier.

When the boom is to be retrieved aboard a vessel, or pulled upon a wharf, or otherwise recovered, the successive air chambers are deflated as they approach the retrieving station so that the boom collapses into a flat sheet of material such, as mentioned above, has a smooth, tough surface free of protruding elements, such as bolts, weights, cables, and so forth, throughout the major portion of its length. Hence, the boom can be drawn over hard edges of wharfs or ships without danger of such protruding elements being caught on them and tearing or otherwise damaging the boom structure.

BRIEF DESCRIPTION OF THE DRAWINGS

FIG. 1 is a schematic representation in side elevation of a boom with the air chambers inflated and indicates the relative operative association of various of the elements of the structure.

FIG. 2 is an enlarged view in side elevation of portions of the boom and illustrates the elements of it in more detail.

FIG. 3 is a sectional view taken along the line 3—3 of FIG. 2.

FIG. 4 is a sectional view taken along the line 4—4 of FIG. 2.

FIG. 5 illustrates the manner in which two boom sections are connected together to form an extended length of boom and shows the manner in which the end portions of successive boom sections are connected in overlapping relationship to form an impervious barrier and the manner in which the stress cables of successive boom sections are connected together in stress transmitting relationship.

FIG. 6 illustrates in end elevation a sectional view of the boom with an air chamber deflated to show the configuration of the boom under this condition.

FIG. 7 is a side elevational view, partly in section, of a modification of a boom in accordance with this invention and illustrates the disposition of stiffening elements between air chambers and shows a modification of the construction of a terminal end of a boom section.

DESCRIPTION OF THE PREFERRED EMBODIMENT

In a preferred embodiment of the invention and as illustrated in the drawings, a section of boom of this invention is formed from a single continuous sheet of fabric such, for example, as nylon or rayon which is impregnated with a rubber-like material such, for example, as neoprene to cause it to be impermeable to air and water. The original sheet is made with a width which is approximately twice the lateral extent of the finished boom with the air chambers deflated and of a desired length which usually is several hundred feet. The sheet is folded in half along its longitudinal median and the halves are superimposed on each other to form the sides of the body of the boom with the fold forming the top edge of it and the aligned superimposed edges of the sheet forming the bottom edge of the boom.

As illustrated in FIGS. 1 and 3, the sides 10 and 12 of the boom 14 are vulcanized together at a location 16 spaced laterally apart from the top edge 18 of the boom and extending for a distance along it parallel to the edge 18 to form an air chamber 20. The sides also are vulcanized together at spaced locations, as 22, 24 and 26, along the length of the boom to form separate air chambers 20, each of several feet length. Each air chamber has its complementary valve means 28 through which the chamber may be inflated with air and through which the air may be released from the chamber to deflate the boom.

The air chambers form the buoyant means which causes the boom to float on the surface of a body of water and to extend sufficiently above the surface to form a barrier for contaminants floating on the surface. The sides of the boom which extend below the flotation chambers 20 are vulcanized together and to elements incorporated between them which are described hereinafter to form the skirt 30 of the boom which remains submerged in the water during use.

The bottom edge portion 32 of the skirt 30 has incorporated in it ballast weights 34. These weights preferably are formed from segments of thin lead sheeting which are distributed along the bottom edge portion of the skirt as illustrated in FIG. 2. Each of the lead segments is spaced apart from the other so that the skirt 30 will be able to bend and flex between the lead segments in the area of the ballast weights. This flexibility of the skirt may be enhanced by decreasing the area of a particular lead segment and using several rows of them illustrated at 36 and 38, FIG. 2, with the rows spaced apart from each other as at 40. Sufficient segments are employed to provide the total amount of ballast desired. The sides 10 and 12 of the boom are vulcanized together in the areas as 42 and 44 between the lead segments to securely capture each segment in a pocket formed in the skirt of the boom. Preferably the sides of the boom also are vulcanized directly to each of the segments to form a composite structure. Thus as illustrated in FIG. 3, each lead segment 34 is incapsulated within and becomes a part of the composite skirt 30.

Although the impregnated fabric of which the boom is made is tough and durable for ordinary handling and shipboard use, it is not designed to withstand directly the high tensile stresses which will be imposed on the boom when it is deployed in the water and exposed to wave action and strong wind and water currents. Therefore, means are incorporated in the boom structure for accepting and distributing the stresses imposed on it in a manner to prevent damage to the fabric of the boom. To this end a tensile cable 46 is placed in the skirt 30 of the boom between and enclosed by the sides 10 and 12 thereof which are vulcanized to it. The cable is located below the air chambers 20 and placed approximately along the longitudinal median of the boom and extends within the skirt longitudinally of the boom to adjacent each end 48 and 50, respectively, thereof. At a location approaching a respective end 48 and 50 of the boom the cable is extended outwardly from between the wall of the skirt 30 through a respective opening 52 and 54 in one side 10 of the boom as illustrated in FIGS. 1 and 2 to provide ends 56 and 58 of the cable which are accessible from the exterior of the boom. Each terminal end 56 and 58 of the cable is formed as an eye or loop 60 and 62, respectively, to which a similar eye of a corresponding tensile cable of another section of boom can be connected as by a bolt and nut 64 as illustrated in FIG. 5.

The respective end portions 66 and 68 of a section of boom extend longitudinally beyond corresponding terminal ends 56 and 58 of the tensile cable and the sides of the boom are vulcanized together in this region to form for each end a single cohesive flap of material. Strips of stiffening material such as strips of synthetic resin which is resistant to the effects of water is secured to each side of each end flap of the section of boom as illustrated at 70 and 72, FIGS. 2 and 5, and the end of the boom in these regions are pierced by holes 74 which provide means for fastening two sections of boom together. As illustrated in FIG. 5 the flap portions of successive sections of booms are placed in overlapping relationship with the corresponding holes 74 in alignment and fastening means, such as bolts and nuts 76 are used to secure the flaps together.

It will be noted in FIG. 5 that when the tensile cables 46 of sequential sections of boom are connected together in stress transmitting relationship the end flaps 66 and 68 of the sequential sections which are connected together are in a slack, non-force transmitting relationship so that no substantial portion of the tensile stress which is imposed on the boom in normal operation is imposed on the fabric of the walls of the boom but rather on the tensile cables.

In use, the assembled sections 14 of the boom may be anchored in a fixed position to collect the contaminants from the water surface as a current of water, tidal or otherwise, sweeps past the position of the boom or the boom may be towed behind boats secured to each end of it to sweep the contaminants from the surface of the water. In either case the boom will assume a bowed condition familiar to the art. Thus the forces on the boom will act both longitudinally of it, that is, along the line of the tensile cables and also laterally of it at right angles to the stress in the tensile cables. This latter force results from the water thrusting against the side of the boom facing the current and is the force which produces the bowed condition of it.

It has been found that the tensile cable which, as described above, is embedded in the skirt 30 can, under adverse conditions, be brought to bear against the side of the boom with sufficient force to cause the cable to tear out of the skirt of the boom in a direction normal to the axis of the cable, thus damaging the boom. The boom is particularly exposed to such damage if it snags while it is being towed or is being lifted by a tensile cable out of the water. It is an important part of this invention to provide a construction which will prevent such damage from occurring. To this end a respective stress plate 78 and 80 is placed in the skirt of the boom adjacent each corresponding end portion 66 and 68 thereof and the end portions 56 and 58 of tensile cable 46 are securely fastened to a respective stress plate so that the forces which tend to tear the stress cable from the skirt of the boom will be transmitted to the stress plate and distributed over an area of the skirt sufficient to prevent such forces from being concentrated destructively where the tensile cable bears against the side of the boom. Preferably as illustrated in FIGS. 2 and 4 each stress plate 78 and 80 is a sheet of metal embedded in the skirt of the boom between the sides 10 and 12 which are vulcanized to it. The stress plate is perforated by holes 82 and 84 to provide improved gripping means between the plate and the material of the side of the boom and at least some of the holes, as 84, are of sufficient diameter to permit the neoprene coating of each of the sides to intrude within the hole and meet and be vulcanized together to assist in securing the stress plate firmly within the skirt of the boom in stress transmitting relationship as illustrated at 86, FIG. 4. Each stress plate is located closely adjacent to the respective openings 52 and 54 through which the end portions 56 and 58 of the stress cable extends outwardly through the side of the boom as explained heretofore and the corresponding end portion of the stress cable is brazed, welded or otherwise securely attached to its complementary stress plate as illustrated at 88 in FIG. 2, for example.

The stress plate may be, and preferably is, formed with a transverse channel 90, FIG. 4, conforming to the diameter of the stress cable 46 and designed to receive the cable in close fitting relationship to assure a secure attachment between these parts when the cable is welded or otherwise affixed to the stress plate. Further, this construction provides a compact arrangement which will not appreciably increase the thickness of the skirt of the boom. By this construction the boom is not only better able to withstand without damage the forces of strong currents of water thrusting against it but also, as stated heretofore, is better able to withstand without damage inadvertent large forces placed on the stress cable as might occur if the boom is snagged on some fixed object while it is being hauled from the water or while it is being towed behind moving vessels. Past experience indicates that such hazards are present during the use of a floating boom.

FIG. 6 illustrates the condition of the boom when the air chambers 20 are deflated. The various elements of the composite structure as described heretofore are selected and assembled within the boom so that when the air chambers are deflated the boom will have a thickness which is not substantially greater than that of the folded sheet of material from which it is made and the parts are arranged so that the sections of the boom will be sufficiently flexible to be folded together in a stored condition or to be wound on a reel. It will be noted that the stiffness provided by the end plates 70 and 72 and the stress plates 78 and 80 adjacent the ends of the boom will not prevent the boom from being stored in the above described manner. By way of example only, the deflated boom may be constructed to have a maximum thickness of about three-eighths inches across its thickest portion.

FIG. 7 illustrates a modification of the boom made in accordance with this invention. This modification is particularly suitable for rough open water conditions where winds, waves and water conditions impose strong forces on the face of the boom as well as on the stress cable. In accordance with this modification, a stiffening element 92 such as a strip of metal plate is incorporated in the boom between each of the air chambers and preferably is placed within and between the sides of the boom and vulcanized in place to them. Thus if an air chamber should be ruptured or otherwise lose its buoyant capacity the stiffening elements 92 at each end of the deflated chamber will assist in holding the fabric of the boom above the surface of the water to maintain its effectiveness as a barrier. The stiffening element 92 also may be made to function as a stress plate by securing the stress cable 46 fixedly to it, in the manner described heretofore in relation to stress plates 78 and 80, as illustrated at 94, FIG. 7, or to selected ones of said stiffening elements throughout the length of the boom section. Thus the forces thrusting the side of the boom laterally against the stress cable are distributed over a larger area of the fabric to prevent them from being localized at the cable proper where sufficient force may be concentrated to cause the cable to tear through the wall of the boom.

The modification illustrated in FIG. 7 shows also an end plate 96 for a boom section which is formed of a strip of metal placed within and between the sides of the boom and vulcanized to them to form a coherent part of the flap 68. Grommeted holes 98 are formed transversely through the flap portion 68 at the location of the plate 96 to receive connecting means for securing the flap of a sequential section of boom to it in a manner similar to that illustrated in FIG. 5.

The stiffening element 92 and the end plates 96 are made from sheet material of a thickness which will not substantially increase the thickness of a deflated boom section so that the result explained in relation to the description of FIG. 6 may be achieved. These elements also are made of a width which will not interfere with storing the collapsed boom in a folded condition or wound on a reel as described heretofore.

It is apparent that equivalents may be substituted for the particular elements described heretofore and other modifications may be made to the structure illustrated as a preferred embodiment without departing from the inventive concept and it is intended that the invention encompass such equivalents and modifications within the scope of the appended claims.

I claim:

1. A boom for collecting material floating on the surface of a body of water comprising in coherent assembly an elongated sheet of fabric impregnated with a rubber-like material to be impervious to water and to air, said sheet being folded along a longitudinal median to form two overlapping sides of said boom with the fold forming the top edge of said sides and the adjoining longitudinal edges of said sheet forming the bottom edge of said sides, means adhering said sides together in airtight relationship throughout a longitudinal extent at a location spaced laterally apart from said top edge, means adhering said sides together in airtight relationship at spaced apart locations along said boom and extending laterally across said sides from said top edge to and including the said adhering of said sides at said longitudinal extent thereby forming separated air receiving chambers between said sides along said top edge thereof, respective valve means in a wall of each of said chambers to admit air into and exhaust air from said chambers, a stress cable positioned between and enclosed by said sides along substantially the entire length of said boom and spaced laterally apart from said chambers, means adhering said sides to the enclosed said cable in fixed relationship continuously along substantially the entire length of said boom, a stress plate positioned between and enclosed by said sides with a portion of said plate in alignment with said cable, means adhering said sides to the enclosed said plate in stress transmitting fixed relationship, means securing the enclosed said cable to the enclosed said plate in stress transmitting fixed relationship, a respective opening in one of said sides of said boom adjacent each of the ends thereof, a respective end portion of said cable extended through a complementary said opening, a respective connector means on each said end portion of said cable for connecting second cables thereto in stress transmitting relationship, ballasting weights positioned between and enclosed by said sides and located adjacent to and distributed along said bottom edge of said boom, and means adhering said sides of said boom continuously to each other and to said weights adjacent to and along said bottom edge, said boom being constructed and arranged to contain the elements of said coherent assembly within and enclosed by the said sides of said folded sheet to provide a substantially flat, uninterrupted surface for said boom when air is exhausted from said chambers.

2. A boom in accordance with claim 1 wherein a respective said stress plate is positioned adjacent each end of said boom and located between and enclosed by said sides adjacent the said opening through which the said end portion of said cable is extended and wherein each said end portion of said cable is secured to a respective complementary said stress plate in stress transmitting relationship and with the said respective end portion of said cable extending from said stress plate and through a said adjacent said complementary opening in said side of said boom.

3. A boom in accordance with claim 2 wherein the overlapping said sides of said boom are vulcanized together and to said cable and to said stress plates, and said air chambers are formed by portions of said overlapping sides which are not vulcanized together.

4. A boom in accordance with claim 1 wherein said boom forms a section of an extended boom means and said section includes second connector means on each end thereof for securing additional sections of said extended boom means thereto, said second connector means comprising a rigid element secured to an end of said section and extending laterally thereof substantially from the said top edge to the said bottom edge, and fastening means on said rigid element for alignment with a complementary fastening means of an additional section of boom, said second connector means being constructed and arranged for securing sections of boom together sequentially in substantially water-tight relationship, and means separate from said second connector means for operatively connecting together in stress transmitting relationship said stress cable of sequential boom sections.

5. A boom in accordance with claim 4 wherein said rigid element is a plate of rigid material positioned between and enclosed by said sides, and wherein said sides are vulcanized to said plate.

6. A respective boom in accordance with claim 1 including a stiffening element located between at least some of adjacent one of said air receiving chambers and extending laterally of said boom from substantially the top edge to the bottom edge thereof, and means securing said respective stiffening element to a side of said boom in fixed relationship thereto.

7. A boom in accordance with claim 6 wherein said stiffening element is in the form of a thin plate of material and wherein said stiffening element is positioned between and enclosed by said sides, and wherein said sides are vulcanized to said stiffening element.

8. A boom in accordance with claim 1 wherein said ballasting weights are formed of segments of thin sheet lead and wherein said segments are spaced longitudinally and laterally apart from each other to permit the sides of said boom to be flexible in the region of said ballasting weights and wherein said sides are vulcanized to said lead segments.

9. A boom in accordance with claim 7 wherein said stiffening elements are constructed and arranged to function as stress plates, and wherein said cable is secured to at least some of said stiffening elements in stress transmitting relationship.

10. A boom for collecting material floating on the surface of a body of water comprising an elongated body of flexible material, flotation means positioned along a longitudinal first edge portion of said body, a skirt portion of said body extending along said body and attached to said flotation means with a free longitudinal edge of said skirt portion forming a longitudinal second edge portion of said body, ballast weight means embedded within and enclosed by said skirt portion and distributed adjacent to and along said longitudinal second edge portion of said body, a tensile cable embedded in said skirt portion at a location between said longitudinal edges of said body and extending longitudinally substantially coextensively with said skirt portion, means adhering said skirt portion to said cable in fixed stress transmitting relationship continuously along substantially the entire length of said boom, a respective stress plate embedded in said skirt portion adjacent each end thereof, means adhering said respective stress plate to said skirt portion in stress transmitting relationship, means affixing a respective end portion of said stress cable to a corresponding said stress plate in stress transmitting relationship, a respective connector means on each end of said stress cable and arranged to permit a stress transmitting means to be connected to said cable, thereby to cause stress imposed on said stress cable by said stress transmitting means to be transmitted from said stress cable to said flexible body through said stress plate.

* * * * *

PO-1050
(5/69)

UNITED STATES PATENT OFFICE
CERTIFICATE OF CORRECTION

Patent No. 3,792,589          Dated February 19, 1974

Inventor(s)  JAMES A. SAYLES

It is certified that error appears in the above-identified patent and that said Letters Patent are hereby corrected as shown below:

Col. 1, line 24, "we are" should read --I am--.

Col. 7, line 59, "exhuasted" should read --exhausted--.

Col. 8, line 35, "A respective boom in accordance with claim 1 including a" should read --A boom in accordance with Claim 1 including a respective--;

line 37, "one" should read --ones--.

Signed and sealed this 1st day of October 1974.

(SEAL)
Attest:

McCOY M. GIBSON JR.
Attesting Officer

C. MARSHALL DANN
Commissioner of Patents